(12) United States Patent
Collyer et al.

(10) Patent No.: US 11,173,967 B2
(45) Date of Patent: Nov. 16, 2021

(54) CAB AND FASTENERS FOR VEHICLE CAB

(71) Applicant: Arctic Cat Inc., Thief River Falls, MN (US)

(72) Inventors: Leigh Raymond Collyer, Sauk Rapids, MN (US); Aaron Lee Swanson, Bemidji, MN (US); Matthew Eastwood, Milaca, MN (US)

(73) Assignee: ARCTIC CAT INC., Thief River Falls, MN (US)

(*) Notice: Subject to any disclaimer, the term of this patent is extended or adjusted under 35 U.S.C. 154(b) by 41 days.

(21) Appl. No.: 16/839,516

(22) Filed: Apr. 3, 2020

(65) Prior Publication Data
US 2020/0231225 A1    Jul. 23, 2020

Related U.S. Application Data

(63) Continuation of application No. 15/927,719, filed on Mar. 21, 2018, now Pat. No. 10,717,474.

(60) Provisional application No. 62/474,556, filed on Mar. 21, 2017.

(51) Int. Cl.
| | |
|---|---|
| *B62D 27/06* | (2006.01) |
| *B60J 7/10* | (2006.01) |
| *B60J 7/16* | (2006.01) |
| *F16B 5/06* | (2006.01) |
| *B60J 7/19* | (2006.01) |
| *B60J 7/11* | (2006.01) |
| *B60J 1/04* | (2006.01) |
| *B60J 5/04* | (2006.01) |
| *F16B 2/24* | (2006.01) |

(52) U.S. Cl.
CPC ........... *B62D 27/06* (2013.01); *B60J 1/04* (2013.01); *B60J 5/047* (2013.01); *B60J 7/106* (2013.01); *B60J 7/11* (2013.01); *B60J 7/165* (2013.01); *B60J 7/194* (2013.01); *F16B 5/0685* (2013.01); *B60Y 2200/124* (2013.01); *B60Y 2200/20* (2013.01); *F16B 2/245* (2013.01)

(58) Field of Classification Search
CPC ..... B62D 27/06; B60J 7/11; B60J 1/04; B60J 5/047; B60J 7/106; B60J 7/165; B60J 7/194; F16B 5/0685; F16B 2/245; B60Y 2200/124; B60Y 2200/20
USPC ...................................................... 296/190.01
See application file for complete search history.

(56) References Cited

U.S. PATENT DOCUMENTS

| | | |
|---|---|---|
| 1,687,590 A | 10/1928 | Randol |
| 2,085,738 A | 7/1937 | Coleman |
| 2,138,438 A | 11/1938 | Max |
| 2,344,072 A | 3/1944 | Otto |
| 2,481,943 A | 9/1949 | Murphy et al. |

(Continued)

OTHER PUBLICATIONS

QA1 Bearing Kits, http://www.qa1.net/suspension/street-performance-racing-shock-accessories/bearing-kits.

(Continued)

*Primary Examiner* — Pinel E Romain
(74) *Attorney, Agent, or Firm* — Billion & Armitage (57) ABSTRACT

A utility vehicle including a cab assembly, a roof assembly, a windshield assembly, a rear window assembly, and two or more couplers attached to one or more ROPS members. The couplers are each aligned with and are releasably connected with a buckle insert attached to one or more of the roof assembly, windshield assembly, rear window assembly and doors of the cab assembly.

14 Claims, 11 Drawing Sheets

(56) References Cited

U.S. PATENT DOCUMENTS

| | | |
|---|---|---|
| RE23,623 E | 2/1953 | Randol |
| RE24,122 E | 2/1956 | Randol |
| 3,107,762 A | 10/1963 | Snyder et al. |
| 3,627,379 A | 12/1971 | Faust |
| 3,743,047 A | 7/1973 | Dapolito |
| 3,922,030 A | 11/1975 | Stedman |
| 4,138,155 A | 2/1979 | Chrysler |
| 4,217,970 A | 8/1980 | Chika |
| 4,431,234 A | 2/1984 | Lacey |
| 4,537,446 A | 8/1985 | Roney et al. |
| 4,541,654 A | 9/1985 | Jonasson |
| 4,623,196 A | 11/1986 | Roney |
| 4,679,847 A * | 7/1987 | Dirck ................ B60J 7/106 296/190.1 |
| 4,679,854 A | 7/1987 | Putsch et al. |
| 4,798,400 A | 1/1989 | Kosuge |
| 4,799,708 A | 1/1989 | Handa et al. |
| 4,810,035 A | 3/1989 | Takahashi |
| 4,883,287 A | 11/1989 | Murakami et al. |
| 5,071,391 A | 12/1991 | Kita |
| 5,125,677 A | 6/1992 | Ogilvie et al. |
| 5,161,275 A | 11/1992 | Simpson et al. |
| 5,327,989 A | 7/1994 | Furuhashi et al. |
| 5,362,118 A * | 11/1994 | Houriez ................ B60J 1/04 296/190.1 |
| 5,498,018 A | 3/1996 | Wahl et al. |
| 5,538,274 A | 7/1996 | Schmitz et al. |
| 5,560,651 A | 10/1996 | Kami et al. |
| 5,568,959 A | 10/1996 | Weber et al. |
| 5,722,724 A | 3/1998 | Takei et al. |
| 5,725,273 A | 3/1998 | Vernon et al. |
| 5,820,150 A | 10/1998 | Archer et al. |
| 5,921,341 A | 7/1999 | Atkins |
| 5,988,757 A | 11/1999 | Vishey et al. |
| 6,102,481 A | 8/2000 | Tateyama |
| 6,142,253 A | 11/2000 | Mueller et al. |
| 6,223,865 B1 | 5/2001 | Lang et al. |
| 6,257,081 B1 | 7/2001 | Gagnon et al. |
| 6,343,666 B1 | 2/2002 | Olson et al. |
| 6,378,881 B2 | 4/2002 | Stenvall |
| 6,419,608 B1 | 7/2002 | Miller |
| 6,551,210 B2 | 4/2003 | Miller |
| 6,623,067 B2 | 9/2003 | Gabbianelli et al. |
| 6,688,616 B1 | 2/2004 | Ziech |
| 6,767,022 B1 | 7/2004 | Chevalier |
| 6,799,781 B2 | 10/2004 | Rasidescu et al. |
| D498,435 S | 11/2004 | Saito et al. |
| 6,817,647 B1 | 11/2004 | Green |
| 6,863,288 B2 | 3/2005 | Van Den Brink et al. |
| 6,866,110 B2 | 3/2005 | Mallette et al. |
| 6,866,322 B2 | 3/2005 | Willard |
| 6,935,672 B2 | 8/2005 | Dehart |
| D513,223 S | 12/2005 | Saito et al. |
| 7,000,931 B1 | 2/2006 | Chevalier |
| 7,004,484 B1 | 2/2006 | Chevalier |
| 7,029,194 B2 | 4/2006 | Ishikawa et al. |
| 7,040,708 B2 | 5/2006 | Black |
| 7,070,239 B1 | 7/2006 | Ugrekhelidze et al. |
| 7,083,176 B2 | 8/2006 | Soles et al. |
| 7,121,623 B2 | 10/2006 | Fujihara et al. |
| 7,249,798 B2 | 7/2007 | Saito et al. |
| 7,281,753 B2 | 10/2007 | Curtis, Jr. et al. |
| 7,311,167 B2 | 12/2007 | Takayanagi et al. |
| 7,331,270 B2 | 2/2008 | Booher |
| 7,347,490 B2 | 3/2008 | Kobayashi et al. |
| 7,445,075 B2 | 11/2008 | Ozawa et al. |
| 7,487,985 B1 | 2/2009 | Mighell |
| 7,533,754 B2 | 5/2009 | Burrows et al. |
| 7,571,788 B2 | 8/2009 | Barnard |
| 7,578,523 B2 | 8/2009 | Kosuge et al. |
| 7,581,464 B2 | 9/2009 | Munz |
| 7,600,769 B2 | 10/2009 | Bessho et al. |
| 7,640,823 B2 | 1/2010 | Bowman et al. |
| 7,661,689 B2 | 2/2010 | Kinugasa |
| 7,686,379 B2 | 3/2010 | Lemieux |
| 7,690,661 B2 | 4/2010 | Tsuruta et al. |
| 7,722,063 B2 | 5/2010 | Dieziger |
| 7,753,427 B2 | 7/2010 | Yamamura et al. |
| 7,819,220 B2 | 10/2010 | Sunsdahl et al. |
| 7,819,428 B2 | 10/2010 | Tsuruta et al. |
| 7,828,364 B2 | 11/2010 | Causey |
| 7,887,116 B2 | 2/2011 | Feng |
| 7,926,862 B2 | 4/2011 | Smith et al. |
| 7,938,410 B2 | 5/2011 | Buma et al. |
| 7,938,481 B2 | 5/2011 | Kobayashi et al. |
| 7,950,486 B2 | 5/2011 | Van Bronkhorst et al. |
| 8,156,841 B2 | 4/2012 | Yasuda et al. |
| 8,251,170 B2 | 8/2012 | Miura |
| 8,292,352 B2 | 10/2012 | Furman et al. |
| 8,328,235 B2 | 12/2012 | Schneider et al. |
| 8,382,125 B2 | 2/2013 | Sunsdahl et al. |
| 8,408,088 B2 | 4/2013 | Park et al. |
| 8,418,580 B2 | 4/2013 | Ruhlander et al. |
| 8,439,141 B2 | 5/2013 | Bessho et al. |
| 8,459,397 B2 | 6/2013 | Bessho et al. |
| 8,465,050 B1 | 6/2013 | Spindler et al. |
| 8,485,541 B2 | 7/2013 | Pozio |
| 8,556,324 B1 | 10/2013 | Takegami et al. |
| 8,579,310 B2 | 11/2013 | Tanaka et al. |
| 8,585,088 B1 | 11/2013 | Kaku et al. |
| 8,596,405 B2 | 12/2013 | Sunsdahl et al. |
| 8,613,335 B2 | 12/2013 | Deckard et al. |
| 8,613,336 B2 | 12/2013 | Deckard et al. |
| 8,640,814 B2 | 2/2014 | Deckard et al. |
| RE44,854 E | 4/2014 | Henderson |
| 8,696,006 B2 | 4/2014 | Sanschagrin et al. |
| 8,714,618 B1 | 5/2014 | Heit et al. |
| 8,746,719 B2 | 6/2014 | Safranski et al. |
| 8,752,878 B2 | 6/2014 | Yamamoto et al. |
| 8,827,028 B2 | 9/2014 | Sunsdahl et al. |
| 8,870,206 B1 | 10/2014 | Bandy |
| 8,893,571 B2 | 11/2014 | Rouleau |
| 8,911,312 B2 | 12/2014 | Itoo et al. |
| 8,944,449 B2 | 2/2015 | Hurd et al. |
| 8,973,701 B2 | 3/2015 | Holihan et al. |
| 8,997,908 B2 | 4/2015 | Kinsman et al. |
| 9,114,682 B1 | 8/2015 | Bandy |
| 9,126,581 B2 | 9/2015 | Swales et al. |
| 9,180,801 B2 | 11/2015 | Kennedy et al. |
| 9,182,012 B2 | 11/2015 | Greiss et al. |
| 9,217,501 B2 | 12/2015 | Deckard et al. |
| 9,279,443 B2 | 3/2016 | Kulkarni et al. |
| 9,381,940 B2 | 7/2016 | Gale |
| 9,394,014 B2 | 7/2016 | Girouard et al. |
| 9,518,623 B2 | 12/2016 | Mastie et al. |
| 9,694,676 B2 | 7/2017 | Bandy |
| 9,713,976 B2 | 7/2017 | Miller et al. |
| 9,719,591 B2 | 8/2017 | Wade et al. |
| 9,764,639 B2 | 9/2017 | Park et al. |
| 9,771,112 B2 | 9/2017 | Spindler et al. |
| 9,845,004 B2 | 12/2017 | Hedlund et al. |
| 9,863,523 B2 | 1/2018 | Stocks et al. |
| 10,066,728 B2 | 9/2018 | Yolitz |
| 10,207,554 B2 | 2/2019 | Schroeder et al. |
| 10,207,555 B2 | 2/2019 | Mailhot et al. |
| 10,266,052 B2 | 4/2019 | Vermeersch et al. |
| 10,281,039 B2 | 5/2019 | Dearden et al. |
| 10,300,877 B2 | 5/2019 | Gordon |
| 10,442,264 B2 | 10/2019 | Mailhot et al. |
| 10,451,181 B2 | 10/2019 | Saarela |
| 10,479,422 B2 | 11/2019 | Hollman et al. |
| 10,639,976 B2 * | 5/2020 | Pepe ................ B60R 13/02 |
| 2004/0021286 A1 | 2/2004 | Bombardier et al. |
| 2004/0026146 A1 | 2/2004 | Mallette et al. |
| 2004/0178600 A1 | 9/2004 | Wagner |
| 2004/0227321 A1 | 11/2004 | Kuroki et al. |
| 2005/0072613 A1 | 4/2005 | Maltais et al. |
| 2005/0077098 A1 | 4/2005 | Takayanagi et al. |
| 2005/0140176 A1 | 6/2005 | Hampel |
| 2005/0186024 A1 | 8/2005 | Ruhlander |
| 2006/0169549 A1 | 8/2006 | Lang et al. |
| 2007/0021222 A1 | 1/2007 | Voigt |
| 2007/0090621 A1 | 4/2007 | Vigen |
| 2007/0108712 A1 | 5/2007 | Ryan |

(56) References Cited

U.S. PATENT DOCUMENTS

| | | |
|---|---|---|
| 2007/0219030 A1 | 9/2007 | Ho |
| 2008/0023240 A1 | 1/2008 | Sunsdahl et al. |
| 2008/0023249 A1 | 1/2008 | Sunsdahl et al. |
| 2008/0100018 A1 | 5/2008 | Dieziger |
| 2008/0265609 A1 | 10/2008 | Orrell et al. |
| 2009/0120231 A1 | 5/2009 | Choby et al. |
| 2009/0184534 A1 | 7/2009 | Smith et al. |
| 2009/0243339 A1 | 10/2009 | Orr et al. |
| 2009/0301830 A1 | 12/2009 | Kinsman et al. |
| 2011/0079454 A1 | 4/2011 | Maguire et al. |
| 2011/0241325 A1 | 10/2011 | King et al. |
| 2013/0038082 A1 | 2/2013 | Bertocchi |
| 2013/0113244 A1 | 5/2013 | Kaku et al. |
| 2013/0187407 A1 | 7/2013 | Hufnagl |
| 2013/0241228 A1 | 9/2013 | Fujiwara et al. |
| 2014/0332298 A1 | 11/2014 | Girouard et al. |
| 2015/0015021 A1 | 1/2015 | Breen |
| 2015/0268010 A1 | 9/2015 | Strauss |
| 2016/0258474 A1 | 9/2016 | Jeong |
| 2016/0348731 A1 | 12/2016 | Knuth |
| 2017/0174027 A1 | 6/2017 | Mailhot et al. |
| 2017/0327049 A1 | 11/2017 | Tsumiyama et al. |
| 2018/0031097 A1 | 2/2018 | Matsuura et al. |
| 2018/0038401 A1 | 2/2018 | Cloutier et al. |
| 2018/0186329 A1 | 7/2018 | Tsumiyama et al. |
| 2018/0257467 A1 | 9/2018 | Rodriguez |
| 2018/0326843 A1 | 11/2018 | Danielson et al. |
| 2019/0170193 A1 | 6/2019 | Rodriguez |

OTHER PUBLICATIONS

"Kubota RTV1100 brochure".

Arctic Cat, "2009 Prowler 1000 XTZ 4×4 Baja Metallic Cat Green", 82 pages.

Ford, "Electric Power-Assisted Steering (EPAS) | Ford How-To Video".

Stocksdale, "John Deere and BMW designed a hybrid backhoe", Fox News, published Mar. 9, 2017, 2 pages, available at: httf,://www.foxnews.com/auto'2017/03IOO/john-deere-and-bmw-designed-hybrid-backhoe.html.

* cited by examiner

CAB AND FASTENERS FOR VEHICLE CAB

CROSS-REFERENCE

This application is a continuation of U.S. patent application Ser. No. 15/927,719, filed Mar. 21, 2018, titled "Cab and Fasteners for Vehicle Cab", which claims the benefit of U.S. Provisional Application No. 62/474,556, filed on Mar. 21, 2017, and which applications are incorporated herein by reference. This application is also related to the subject matter of U.S. patent application Ser. No. 15/927,524, filed Mar. 21, 2018, titled, "Off-Road Utility Vehicle"; having inventors Devin Joseph Danielson, Adam Christian Krone, Nathan Len Wiater, Aaron Lee Swanson, Erick John Halvorson, Douglas Robert Grangroth, Kevin James Miller, Jared Richard Spindler, Leigh Raymond Collyer, Donald Scott Hansen, and Joseph Patrick Wood, the contents of which are herein incorporated by reference.

SUMMARY

A utility vehicle including a cab assembly, a roof assembly, a windshield assembly, a rear window assembly, and two or more couplers attached to one or more ROPS members. The couplers are each aligned with and are releasably connected with a buckle insert attached to one or more of the roof assembly, windshield assembly, rear window assembly and doors of the cab assembly.

BRIEF DESCRIPTION OF THE DRAWINGS

In the drawings, which are not necessarily drawn to scale, like numerals may describe similar components in difference views. The drawings illustrate generally, by way of example, but not by way of limitation, various embodiments discussed in the present document.

DETAILED DESCRIPTION

Figure 1:
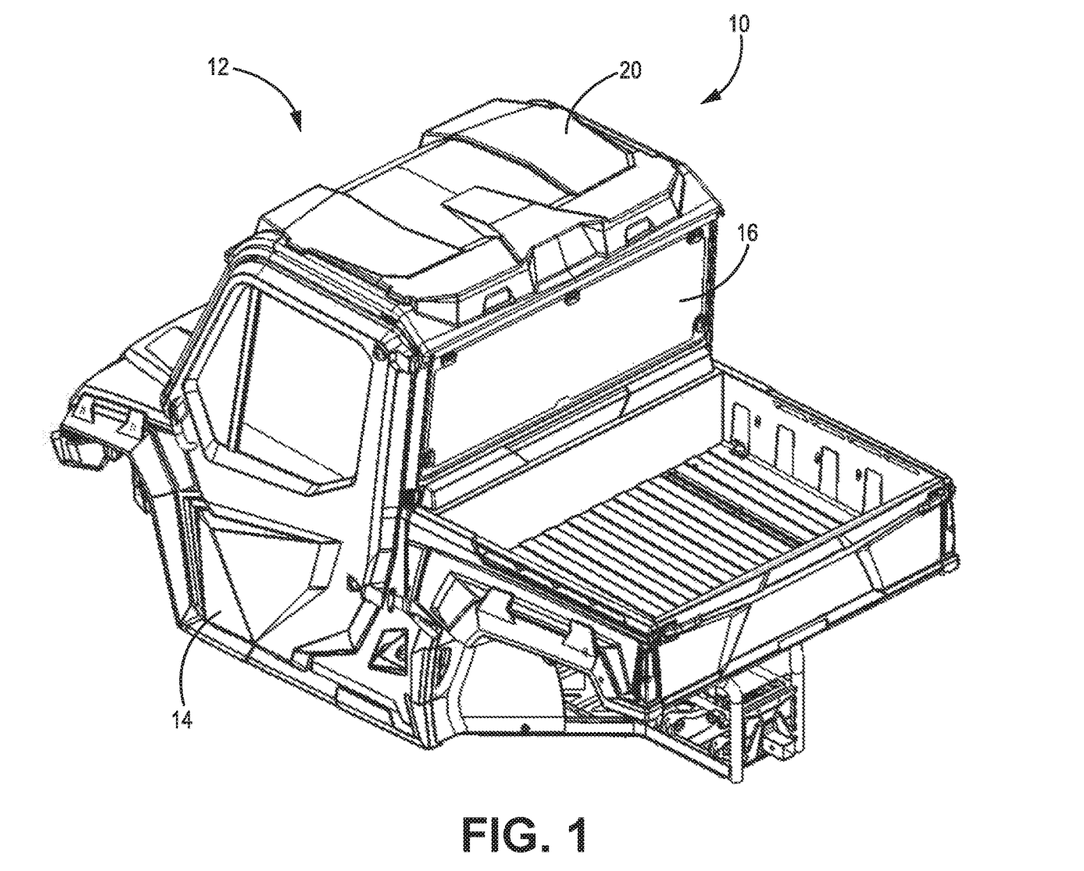
FIG. 1 shows a perspective view of a partial utility vehicle, according to some embodiments.
Figure 2:
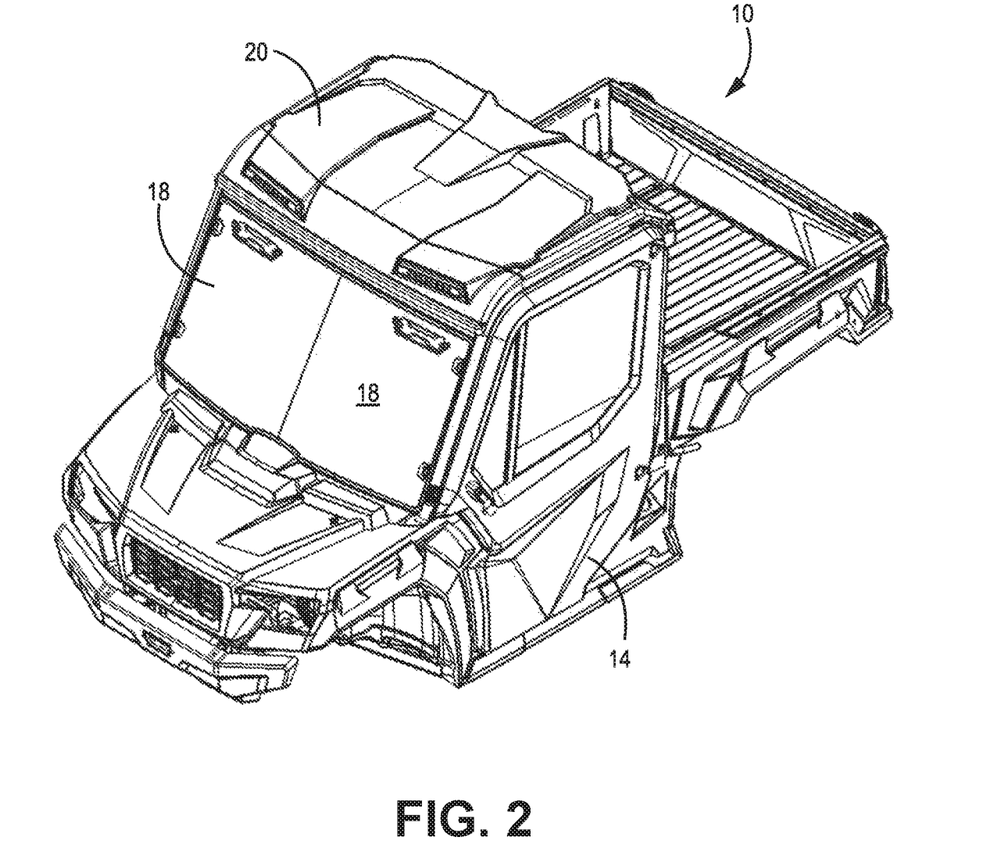
FIG. 2 shows a perspective view of a partial utility vehicle, according to some embodiments.
Figure 3:
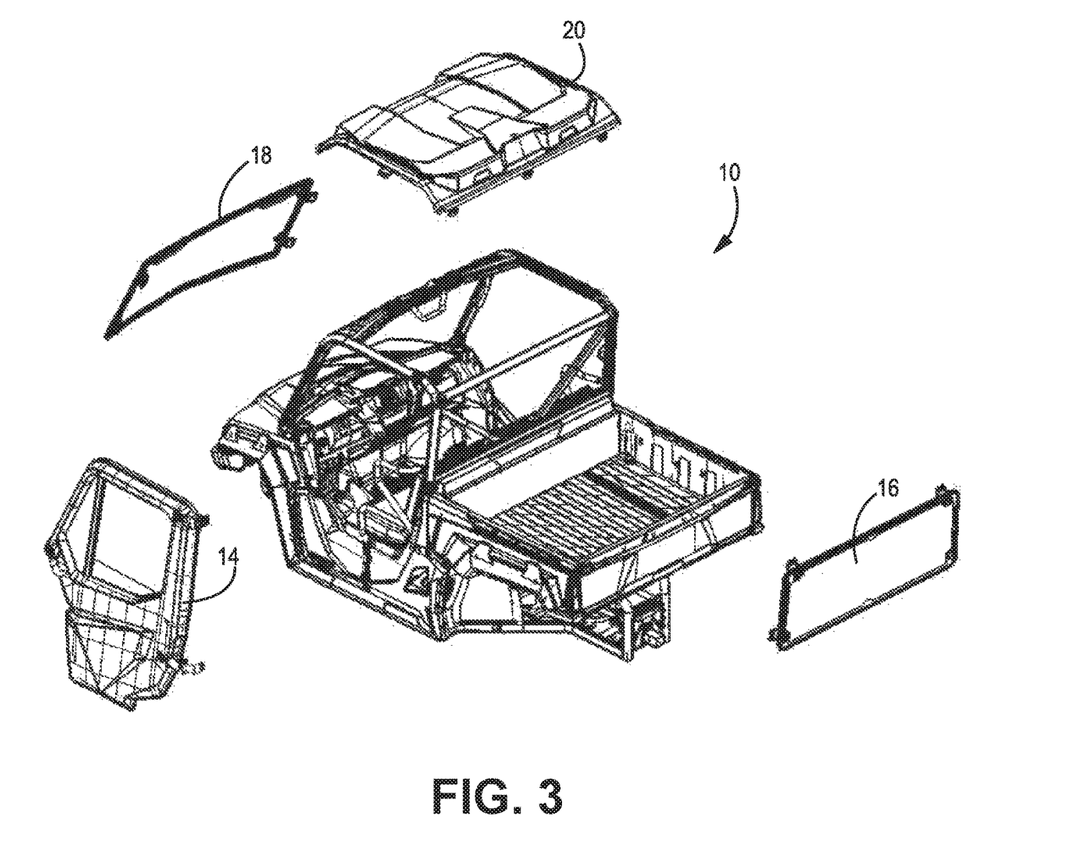
FIG. 3 shows an exploded view of a partial utility vehicle, according to some embodiments.
Figure 4:
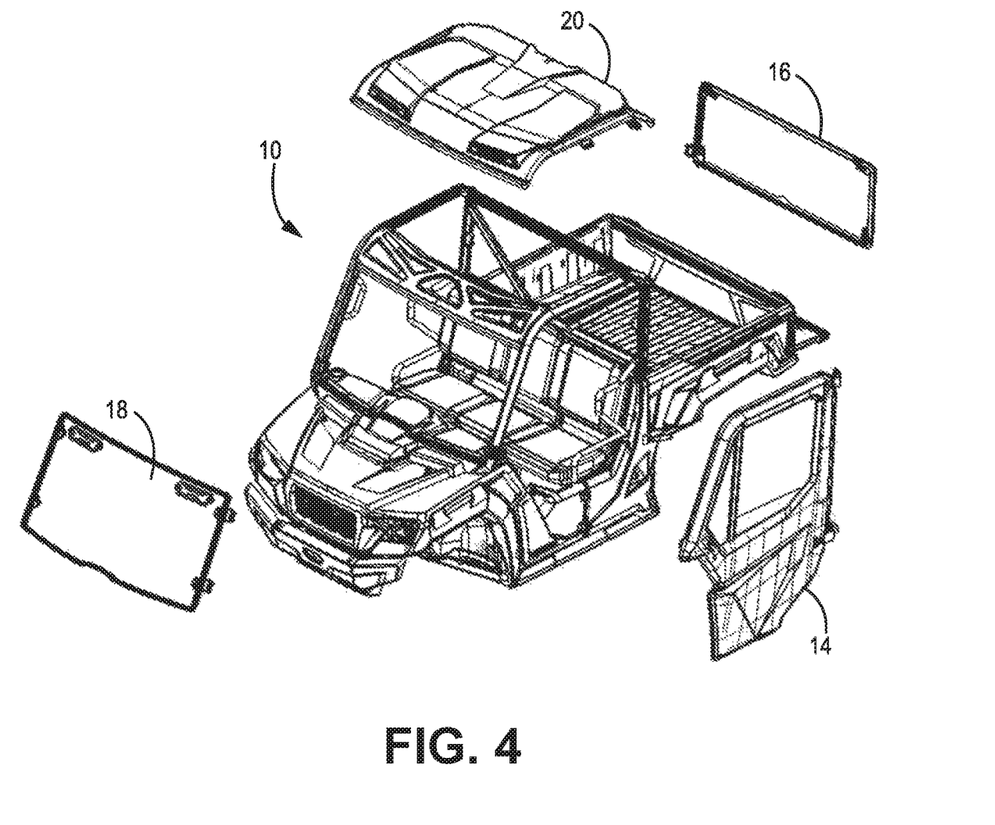
FIG. 4 shows an exploded view of a partial utility vehicle, according to some embodiments.

As shown in perspective views FIGS. 1-2 and exploded views FIGS. 3-4, a utility vehicle 10 comprises at least a cab assembly 12 which, in some embodiments, includes one or more doors 14, rear window assembly 16, windshield assembly 18, and roof assembly 20. In some embodiments, one or more of the doors 14, rear window assembly 16, windshield assembly 18, and roof assembly 20 are removable from the utility vehicle 10 by removing or actuating a fastener.

Figure 5:
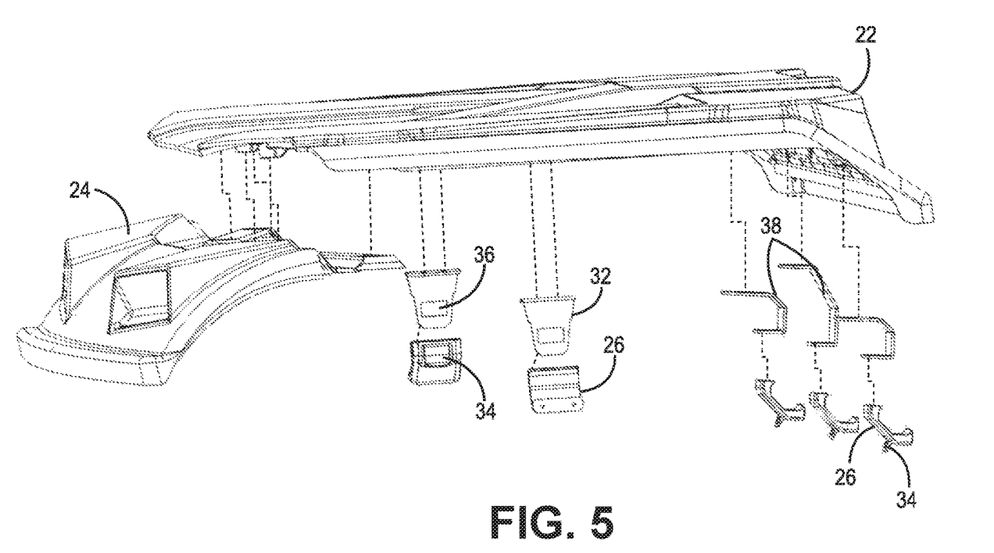
FIG. 5 shows an exploded view of a roof assembly, according to some embodiments.
Figure 6A:
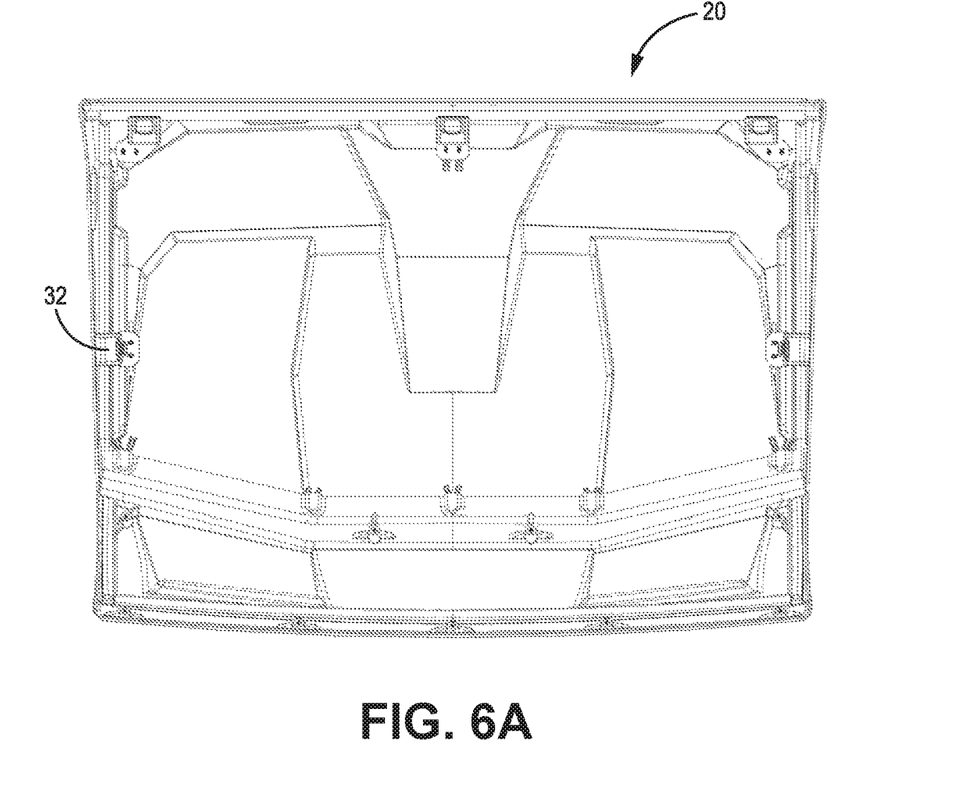
FIG. 6A shows a bottom perspective view of a roof assembly, according to some embodiments.
Figure 6B:
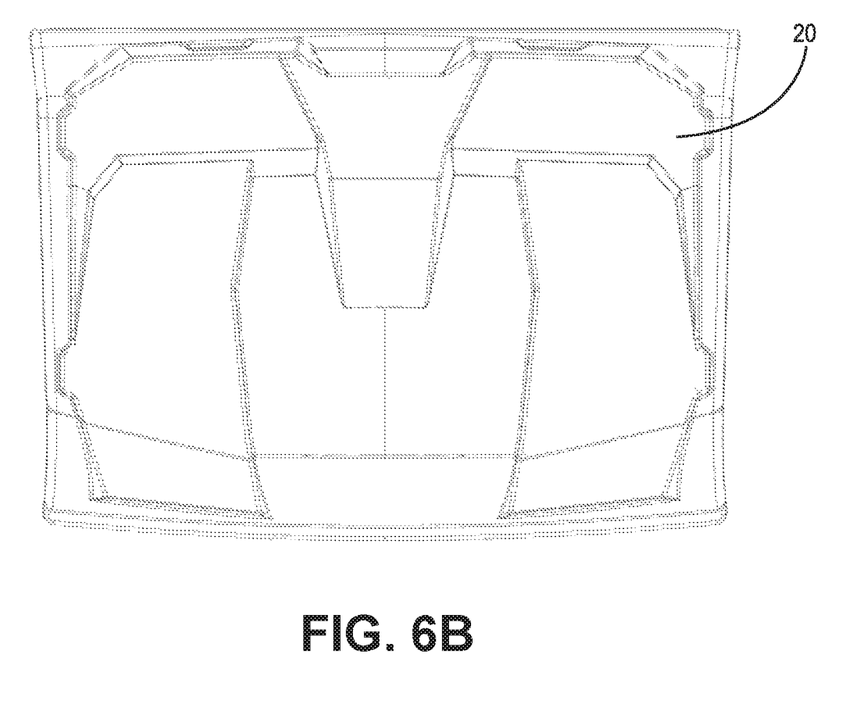
FIG. 6B shows a top perspective view of a roof assembly, according to some embodiments.
Figure 7:
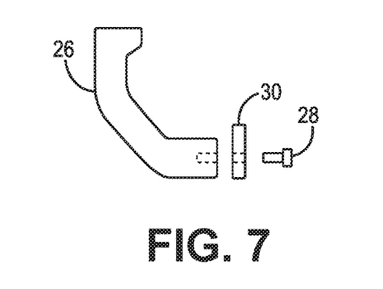
FIG. 7 shows a side view of couplers, according to some embodiments.

With regard to FIGS. 5 and 6, in some embodiments, the roof assembly 20 includes a rear roof portion 22 and a front roof portion 24. The rear roof portion 22 and front roof portion 24 can be fastened together, integrated, or isolated components. In some embodiments, the roof assembly 20 further includes one or more ROPS (Rollover Protective Structures) couplers 26. In some embodiments, the ROPS couplers 26 have a profile that engages the ROPS tubing or members such that the ROPS couplers 26 can be secured to the ROPS tubing using one or more fasteners 28 (see FIG. 7). In some embodiments, a securing member 30 is coupled to the ROPS couplers 26, for example, and/or one or more fasteners 28. The securing member 30 can comprise a flat plate of material, however other shapes are also permissible.

Returning to FIG. 5, in some embodiments, the roof assembly 20 further includes one or more buckle inserts 32. The buckle inserts 32 can be attached to the roof assembly 20 at a first surface and releasably contacted with buckle retainers 34 at a second surface. The buckle inserts 32 can be selectively held in place by the buckle retainers 34 or removed from the ROPS couplers 26 by pressing on a portion of the buckle retainer 34 to release the buckle insert 32. In some embodiments, the buckle retainer 34 includes a barb portion (not shown) that catches on an aperture 36 in the buckle insert 32. Upon pressing on a portion of the buckle retainer 34, however, the barb portion releases the aperture 36 and the buckle insert 32 can be selectively removed from the ROPS coupler 26.

In turn, the buckle inserts 32 are attached (e.g., by one or more fasteners) to one or more portions of the rear window assembly 16, windshield assembly 18, and/or rear roof portion 22. Complementary couplers 26 are positioned on the ROPS tubing or members to releasably contact or connect via buckle retainers 34.

As further shown in FIG. 5, in some embodiments, the roof assembly 20 further includes one or more standoff members 38 which are coupled to the rear roof portion 22, for example via one or more fasteners. The standoff members 38 can be formed form bent sheet metal, for example.

Figure 8:
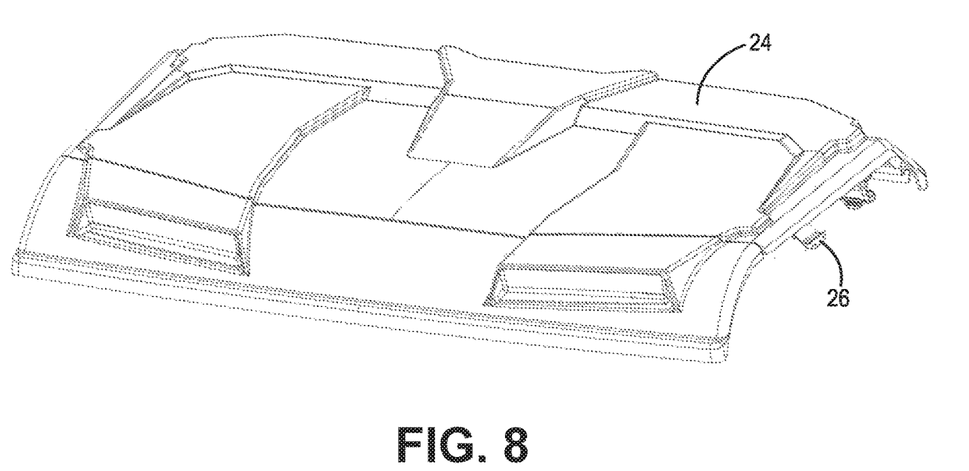
FIG. 8 shows a perspective view of a roof assembly, according to some embodiments.

FIG. 6A shows a bottom or underside view of a rood assembly 20. One or more buckle inserts can be positioned near the perimeter of the roof assembly or in alignment with an ROPS tubing adjacent the roof assembly 20. FIG. 6B shows a top view of roof assembly 20. FIG. 8 shows a perspective view of an example roof assembly 20 with coupler 26 attached.

Figure 9:
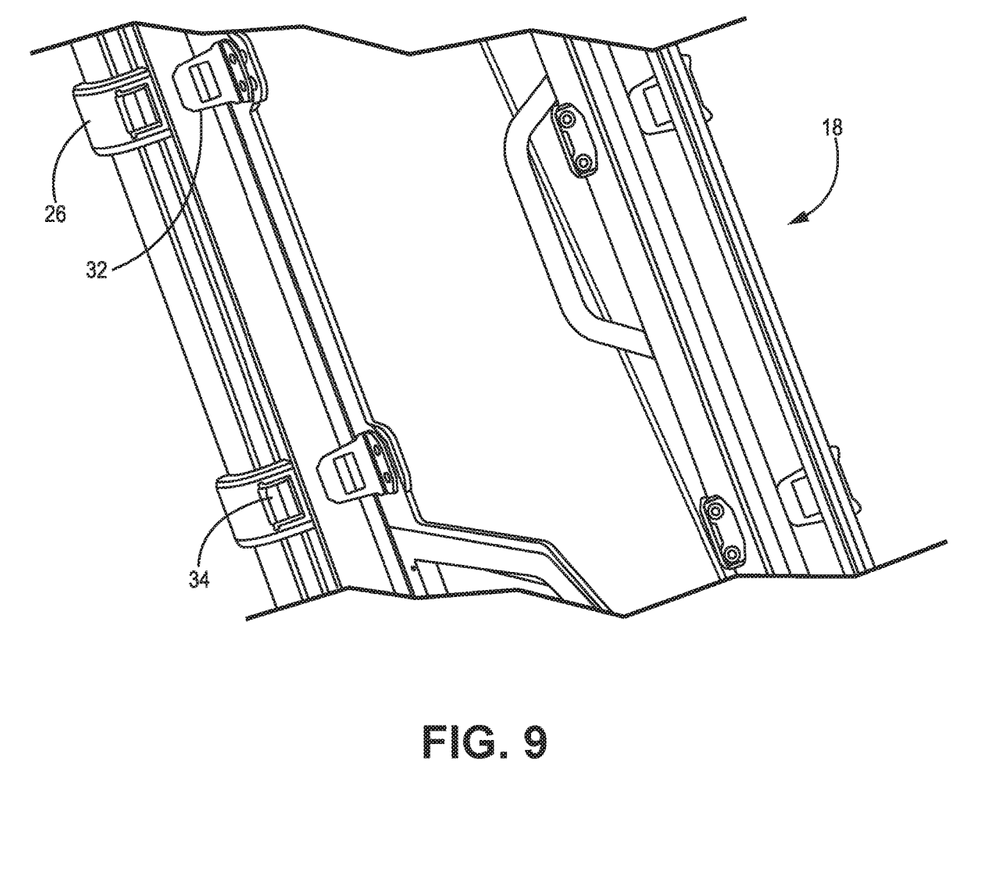
FIG. 9 shows a partial perspective view of a windshield assembly, according to some embodiments.

As discussed above, the couplers 26 can be additionally positioned on one or more of doors 14, rear windshield assembly 16, and windshield assembly 18. FIG. 9 shows four couplers attached to ROPS tubing at a windshield assembly 18. The buckle inserts 32 are releasably or removably connected to buckle retainers 34. As shown in the figure, the windshield assembly can be removed by engaging the coupler 26 at buckle retainer 34.

Figure 10A:
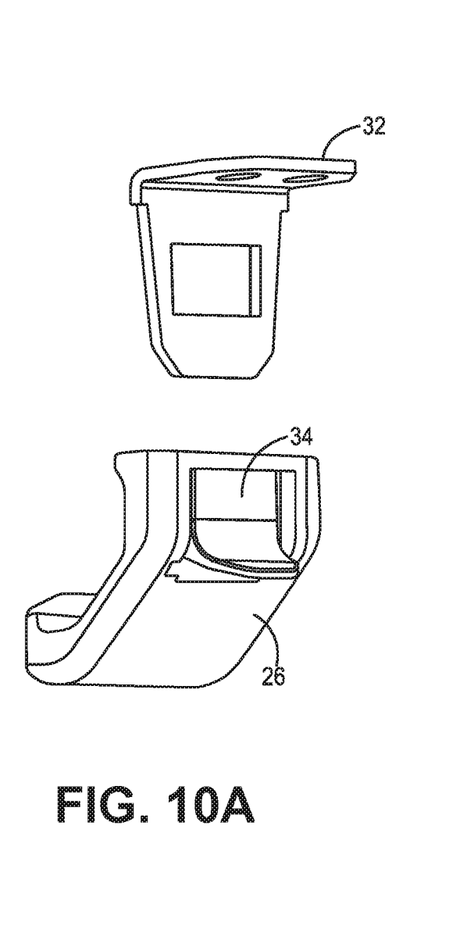
FIGS. 10A-D show views of buckle inserts and couplers, according to some embodiments.
Figure 10B:
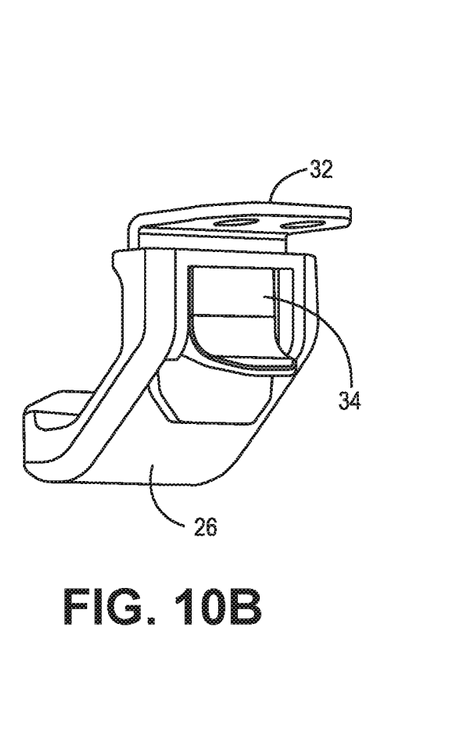
Figure 10C:
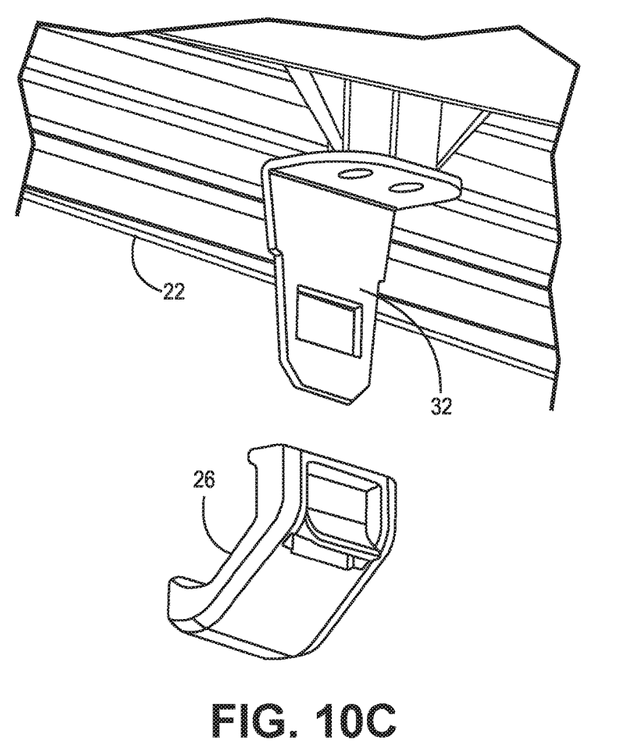
Figure 10D:
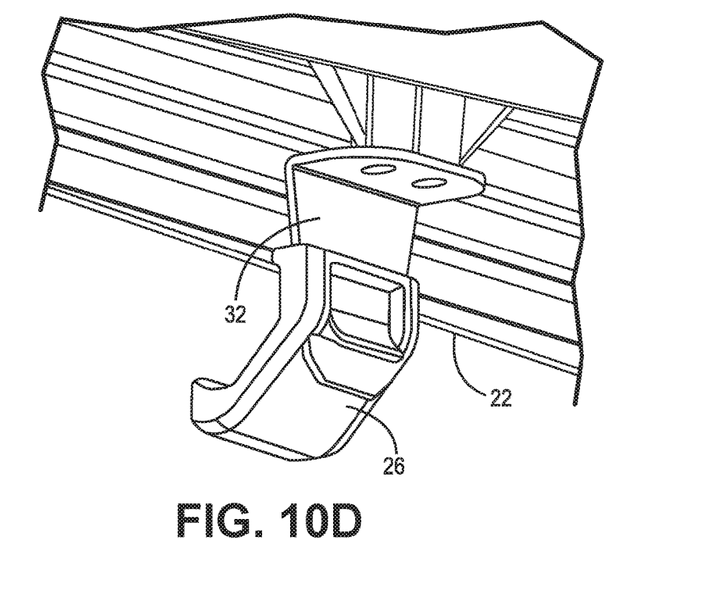

FIGS. 10A-B show a coupler 26 assembly 26 in an engaged (FIG. 10B) and disengaged (FIG. 10A) position. In the engaged position, the buckle insert 32 is releasably secured within buckle retainer 34 of coupler 26. By physically contacting the buckle retainer 34 (such as by pushing, pulling, pressing, etc.), the buckle insert 32 is released from coupler 26 (disengaged position shown in FIG. 10A). FIGS. 10C-D show engaged and disengaged positions when the buckle insert 32 is attached to a roof assembly 20.

What is claimed is:

1. An off-road vehicle comprising:
   a cab;
   a plurality of roll over protection system (ROPS) members positioned around a periphery of the cab; and
   two or more couplers attached to one or more ROPS members, each coupler secured to one or more ROPS members at a proximal end and each coupler including a recess at a distal end for receiving a buckle insert.

2. The off-road vehicle of claim 1, wherein the two or more couplers each includes a buckle retainer for securing the buckle insert, wherein the buckle insert is selectively releasable from a ROPS coupler.

3. The utility vehicle of claim 2, wherein each buckle insert includes an aperture for securing with the buckle retainer of the coupler.

4. The off-road vehicle of claim 2, further including:
   a detachable rear roof assembly; and
   two or more buckle inserts, each buckle insert having a first surface attached to the detachable rear roof assembly and a second surface releasably contacted with the respective buckle retainer of the two or more couplers.

5. The off-road vehicle of claim 2, further including:
   a detachable windshield; and
   two or more buckle inserts, each buckle insert having a first surface attached to the detachable windshield and a second surface releasably contacted with the respective buckle retainer of the two or more couplers.

6. The off-road vehicle of claim 2, further including:
   a detachable rear window assembly; and
   two or more buckle inserts, each buckle insert having a first surface attached to the detachable rear window assembly and a second surface releasably contacted with the respective buckle retainer of the two or more couplers.

7. The ROPS of claim 1, wherein the ROPS members comprises tubing.

8. The utility vehicle of claim 1, wherein the couplers each further comprise a fastener for securing the coupler to a ROPS member.

9. The utility vehicle of claim 8, further comprising a securing member, positioned between the coupler and the ROPS member.

10. A roll over protection system (ROPS) comprising:
    a plurality of ROPS members; and
    two or more couplers attached to one or more ROPS members, each coupler secured to one or more ROPS members at a proximal end and each coupler including a recess at a distal end for receiving a buckle insert, wherein the buckle insert is selectively releasable from a ROPS coupler.

11. The ROPS of claim 10, wherein the two or more couplers each includes a buckle retainer for securing the buckle insert, wherein the buckle insert is selectively releasable from a coupler.

12. The ROPS of claim 11, wherein each buckle insert includes an aperture for securing with the buckle retainer of the coupler.

13. The ROPS of claim 10, wherein the couplers each further comprise a fastener for securing the coupler to a ROPS member.

14. The ROPS of claim 13, further comprising a securing member, positioned between the coupler and the ROPS member.

* * * * *